No. 692,764. Patented Feb. 4, 1902.
W. BUSCH.
MACHINE FOR FORMING KNOTTED LOOPS ON BAGS, PAPERS, &c.
(Application filed Dec. 30, 1901.)
(No Model.) 7 Sheets—Sheet 1.

No. 692,764. Patented Feb. 4, 1902.
W. BUSCH.
MACHINE FOR FORMING KNOTTED LOOPS ON BAGS, PAPERS, &c.
(Application filed Dec. 30, 1901.)
(No Model.) 7 Sheets—Sheet 2.

No. 692,764. Patented Feb. 4, 1902.
W. BUSCH.
MACHINE FOR FORMING KNOTTED LOOPS ON BAGS, PAPERS, &c.
(Application filed Dec. 30, 1901.)
(No Model.) 7 Sheets—Sheet 3.
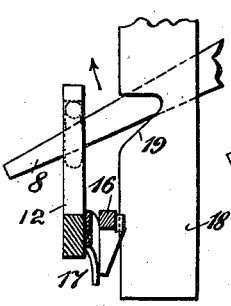
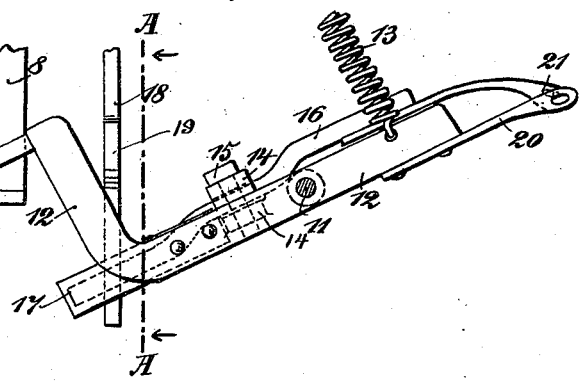

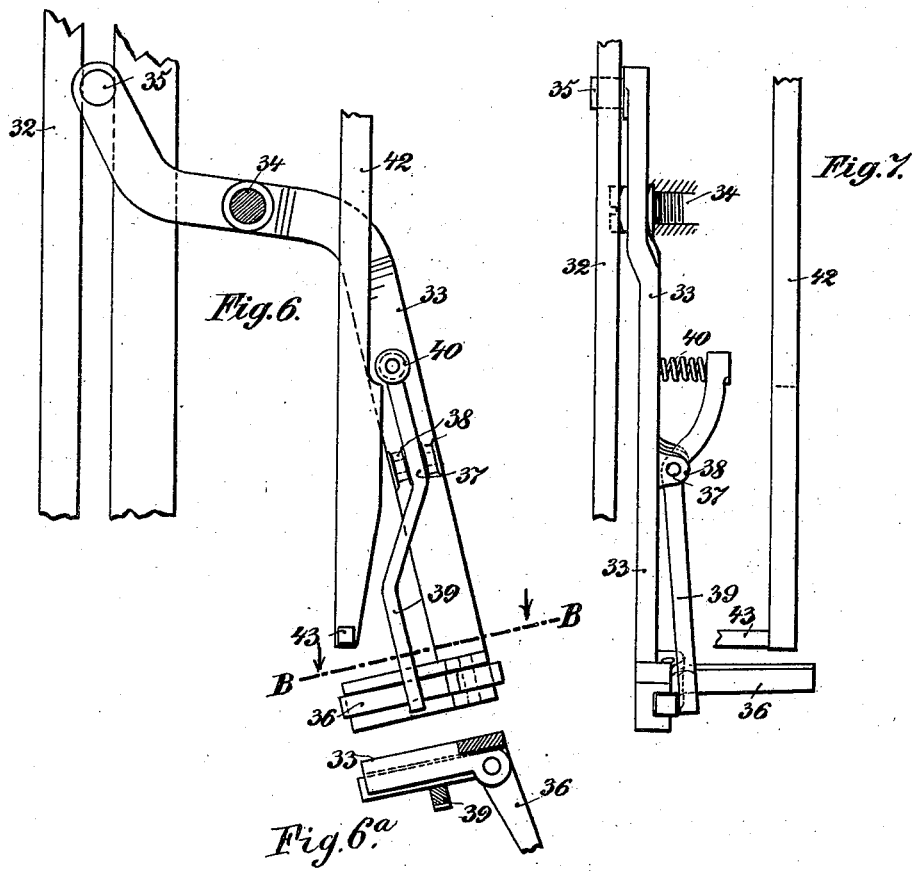

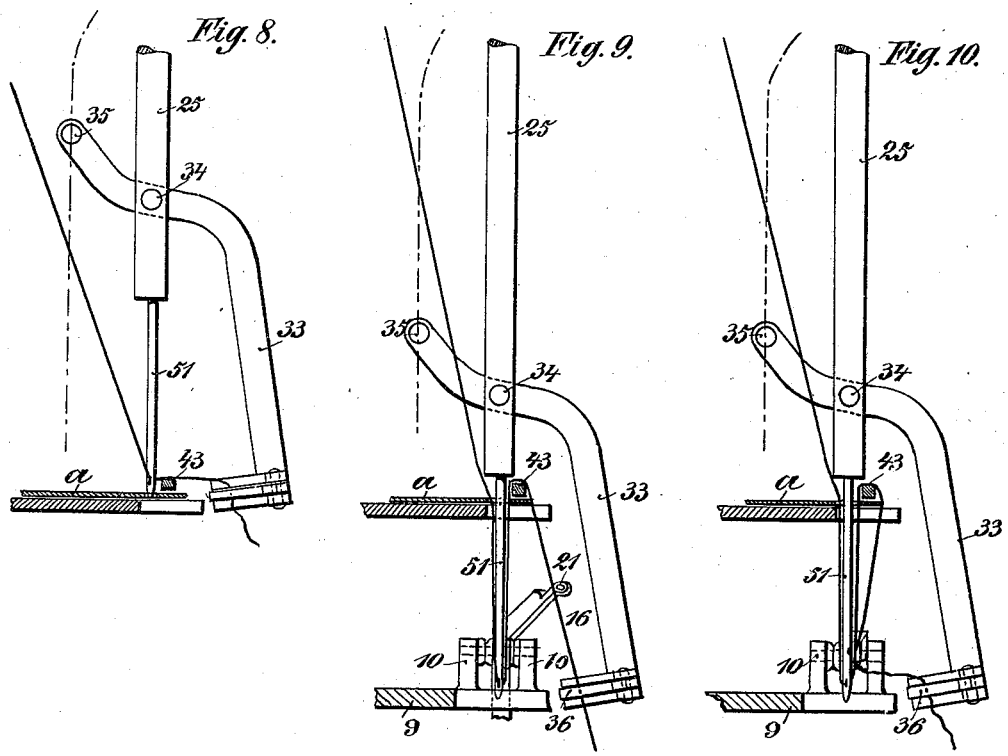

No. 692,764. Patented Feb. 4, 1902.
W. BUSCH.
MACHINE FOR FORMING KNOTTED LOOPS ON BAGS, PAPERS, &c.
(Application filed Dec. 30, 1901.)
(No Model.) 7 Sheets—Sheet 6.

No. 692,764. Patented Feb. 4, 1902.
W. BUSCH.
MACHINE FOR FORMING KNOTTED LOOPS ON BAGS, PAPERS, &c.
(Application filed Dec. 30, 1901.)
(No Model.) 7 Sheets—Sheet 7.
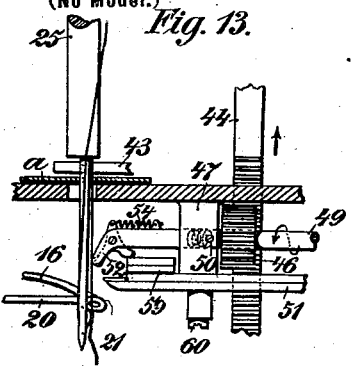
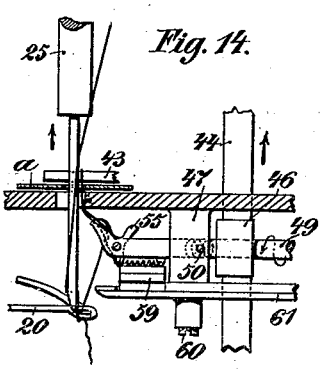
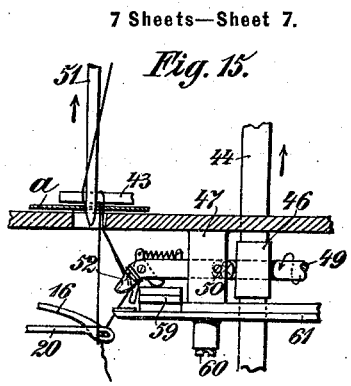
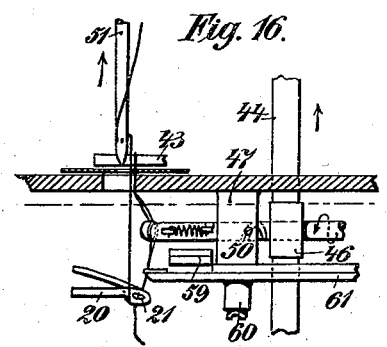
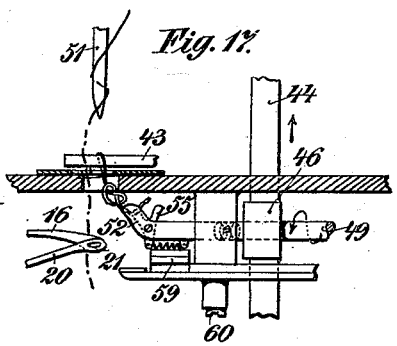
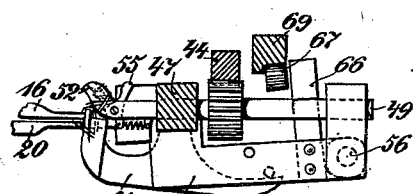
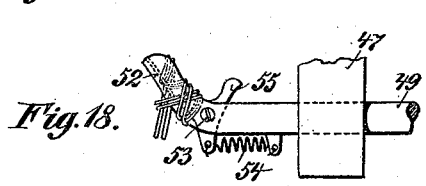
Witnesses:
O. F. Sonnek.
C. von Gruelen
Inventor,
Willy Busch,
By Knight Bros
Attys.
THE NORRIS PETERS CO., PHOTO-LITHO., WASHINGTON, D. C.

UNITED STATES PATENT OFFICE.

WILLY BUSCH, OF OBER-URSEL, GERMANY.

MACHINE FOR FORMING KNOTTED LOOPS ON BAGS, PAPERS, &c.

SPECIFICATION forming part of Letters Patent No. 692,764, dated February 4, 1902.

Application filed December 30, 1901. Serial No. 87,783. (No model.)

*To all whom it may concern:*

Be it known that I, WILLY BUSCH, mechanician, a subject of the King of Prussia, Emperor of Germany, residing at Ober-Ursel-on-the-Taunus, in the Kingdom of Prussia and Empire of Germany, have invented certain new and useful Improvements in Machines for Forming Knotted Loops on Bags, Papers, &c., of which the following is a full, clear, and exact description.

The subject of this invention is a machine or apparatus by means of which knotted loops are formed on bags, memoranda or papers, and the like.

The object of the invention is the formation of the loops in a completer and more certain way than is the case in machines heretofore used for the same purpose.

The new apparatus is shown in the accompanying drawings, in which—

Figure 1:
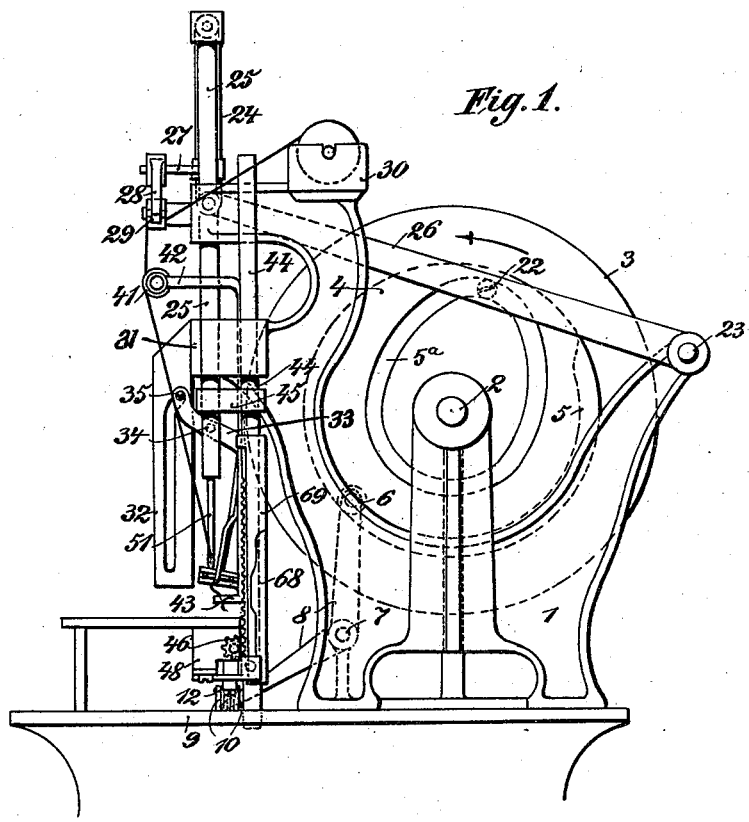
Figure 2:
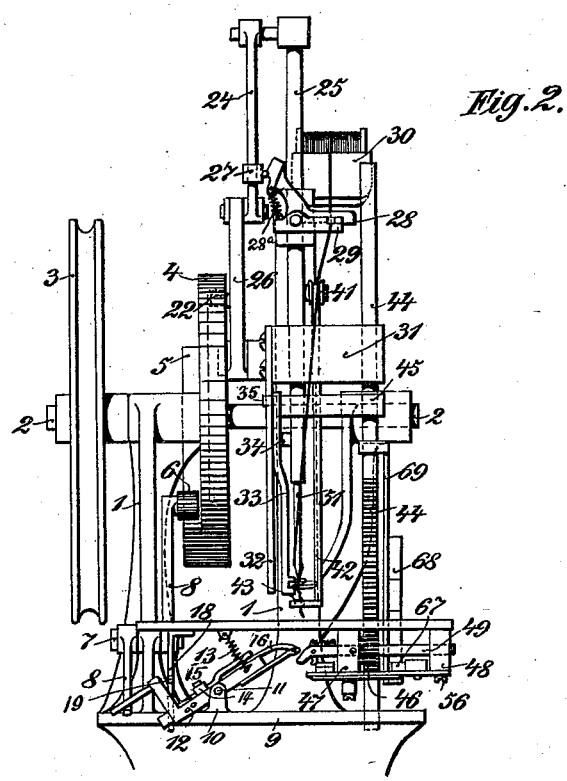
Figure 11:
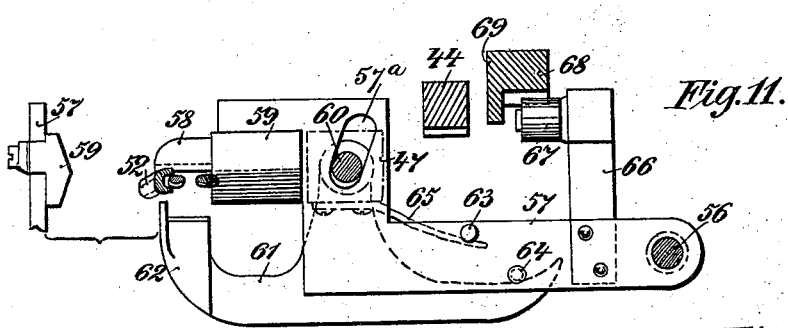
Figure 12:
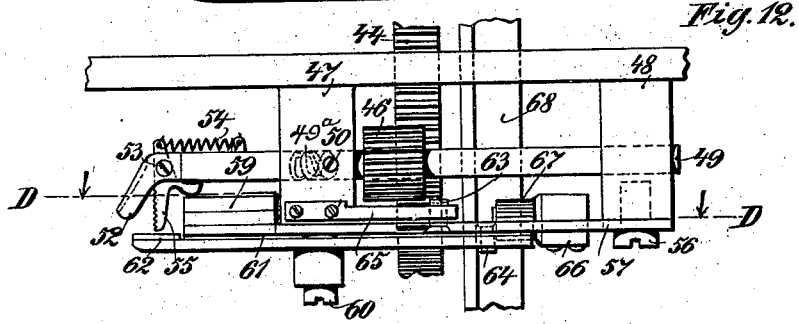

Figure 1 is a side view of my improved machine. Fig. 2 is a front view of the same. Fig. 3 is a detail vertical section of the thread-bars, taken on the line A A, Fig. 4, looking in the direction of the arrows. Fig. 4 is a front view thereof. Fig. 5 is a plan view of the same. Fig. 6 is a detail side view of the thread-holder. Fig. 6ª is a transverse section thereof, taken on the line B B looking in the direction of the arrows. Fig. 7 is a front view of the thread-holder. Figs. 8, 9, and 10 are side views of the thread-holder, showing the three principal positions thereof. Fig. 11 is a detail horizontal section of the knot-former and cutting-off device combined with it, taken on the line D D, Fig. 12, looking in the direction of the arrows. Fig. 12 is a front view thereof. Figs. 13, 14, 15, 16, 17, 18, and 19 are detail views showing the several movements of the same.

In a frame 1 a horizontal shaft 2 revolves, which is set in revolution in the ordinary way by means of a driving-pulley 3. Upon the shaft 2 is fixed a disk 4, which on the side toward the driving-pulley 3 is provided with a projecting cam 5, concentric with the shaft, and the opposite side with an elliptical or oval recess 5ª. Upon the cam 5 runs the roller 6, carried by the angle-lever 8, which turns upon the pin 7, and the free arm of which projects under the bent end of the thread-holder. (Shown in Figs. 3 to 5.) The latter is formed as follows: Between two eyes 10, cast upon the lower part 9 of the frame 1, a double-cranked lever 12 turns upon a bolt or pin 11 and is kept normally upward by a spring 13, Figs. 2 and 4. The lever 12 carries between two eyes 14 a double-armed lever 16, turning upon the pin 15, and pressed against a fixed projecting bar 18 by means of a flat spring 17, fixed upon the lever 12, in such manner that the lever 16 is made to turn upon the pin 15 by the spring 17 if by the turning of the lever 12 on the pin 11 and the consequent raising of the cranked end of the lever 12 by means of the angle-lever 8 the lever 16 reaches the notch 19 of the projecting bar 18, Fig. 3. Upon the lever 12 is fixed a projecting eye 20, into which a pin 21 upon the lever 16 can enter.

In the oval recess 5ª on the disk 4 runs the roller 22 upon the end of a lever 26, connected by a link or bar 24 with the needle-bar 25 and turning upon the center 23. Upon the connecting-bar 24 is fixed a movable block 27, which is adjusted so as to operate the brake-lever of a brake or friction device 29, which is fixed upon the upper guide of the needle-bar 25, Figs. 1 and 2. Behind it the spool-holder 30 is arranged.

Upon the left side, Fig. 2, of the lower needle-bar guide 31 is fixed a slotted guide 32, which serves to operate the thread-holder. (Shown on a larger scale in Figs. 6 and 7.)

A suitable curved lever 33, which turns upon a screw 34, fixed to the needle-bar 25, carries a pin 35 at its upper end, which travels in the slot of the guide 32. At its free lower end the lever 33 is so formed that a small angle-lever 36 can turn in a plane at right angles to the lower arm 33 of the lever. Ordinarily the angle-lever 36 is held in a closed position, as shown in the horizontal section, Fig. 6ª, through B B, at the lower part of Fig. 6, so that a bent lever 39, turning upon a pin 37 in the eyes 38, has its free end pressed by a spring 40 against the angle-lever 36. Near the thread-holder a bent bar or bracket 42, Fig. 2, which carries the guiding-roller 41 for the thread, is brought downward and on its lower end is provided with an inclined edge, so that the angle-lever 36, ordinarily pressed in by the lever 39, is opened by movement along the inclined edge of the bar 42 if the needle-bar 25, with the thread-holder carried by it, has moved upward—that is to say, has approached its highest position. The bar 42 carries a pin 43, which, in the way described farther on, serves to form the loops. At the right of the bar 42 fits, in the lower guide 31, a bar 44, toothed on its side at the lower end, which is attached to the needle-bar 25 by a rigid connecting-arm 45, so that they both have the same movement. The teeth on the bar gear with a toothed wheel 46, Figs. 1, 2, and 12, which is fixed on a spindle 49, turning in the bearings 47 and 48, arranged under the work-table. The spindle 49 is provided, in the part passing through the bearings 47, with a V-shaped double spiral groove $49^a$, so that the point of a screw 50 entering the groove causes a backward-and-forward movement of the spindle endwise when the latter is turned around. To the left of the bearing 47, on the side turned toward the needle, the spindle 49 carries the knotter. This consists of a finger-like bent groove-arm 52 on the end of the spindle, in which can enter a corresponding serrated arm of an angle-lever, which turns upon the screw 53, Fig. 18, and is constantly pressed toward the grooved arm 52 by a spring 54 acting upon another arm of the lever. Below both bearings 47 and 48 lies a suitably-bent bar 57, turning upon a screw 56 in the bearing 48 and carrying a knife-blade 58, Figs. 11 and 12, and an oblique block or cam 59 and having in the part lying under the bearing 47 a slit $57^a$, so that a pin 60 moves in the latter, which at the same time holds the knife-holder 61 from below against the bar 57. The knife-blade 62 also lies opposite the knife 58. In the plate 57 are fixed two pins 63 and 64, of which one, 63, projects upward and when it moves in one direction forms an abutment for the flat spring 65, fixed upon the bearing 47, and the other, 64, which projects downward, when it moves in the other direction presses against the knife-holder 61. Upon the plate 57 a bracket 66, carrying a roller 67, is fixed, which is adjusted to roll along a curved guide 68, which is itself formed upon a bar 69, connected with the toothed bar 44, Figs. 1 and 2.

The operation of the machine is as follows: Supposing any article $a$ to be provided with a knotted loop is laid upon the work-table under the needle 51, the driving-pulley 3 and the shaft 2 are set in revolution in the direction of the arrow Fig. 1 by any suitable means. By the consequent revolution of the disk 4 the following operations take place: The lever 26 by means of the roller 22, running in the oval recess in the disk 4, is moved down and by means of the connecting-link 24 brings down the needle-bar 25 and the needle 51. At the same time the projection 27 on the link or bar 24 releases the pressure of a helical spring $28^a$ and allows the thread coming from the spool 30 to be drawn down by withdrawing the brake action of the lever 28. Together with the needle-bar 25 the thread-holder (shown on a larger scale in Figs. 6 and 7) also moves down and effects a movement—as the pin 35 leaves the upper part of the slot (which is directed to the right, as seen in Fig. 1) in the guide 32—of its lower part, which carries the angle-lever 36 directly from the needle. Before this takes place the angle-lever 36, open up till now and turned outward by the bar 42, has received the thread between itself and its bearing, Fig. 8. The closing of the angle-lever 36 and the consequent gripping of the thread by the lever 39, operated by the spring 40, follows first at the moment when the free arm of the angle-lever moves off the inclined edge of the bar 42. If the needle-bar continues to move still farther down, the thread, held fast by the thread-holder, as shown in Fig. 8, is laid over the pin 43 upon the bar 42 and brings the thread end in the further progress of the downward movement after the perforation of the paper $a$ (in the position shown in Fig. 9) between the eye 20 and the pin 21 of the thread-bar. (Shown on a larger scale in Figs. 3, 4, and 5.) These bars are opened, in the position of the thread-holder shown in Fig. 2, by the pull of the spring 13. As the needle now goes still a little lower down, the roller 6 of the lever 8, Fig. 1, runs upon the projecting cam in the disk 4, and the free arm of the lever 8 presses from below against the cranked end of the lever 12 and turns the latter around the center 11. The lever 16, Fig. 4, is therefore brought at its end opposite to the projecting cam or guide 18, to the height of the notch 19 of the guide 18, and the flat spring 17 can now press the lever 16 into the notch 19, turning it around the center 15 and closing the gripping-bars, so that the pin 21 enters the eye 20. By this closing the position of the thread shown in Fig. 10 is reached. As the projection 5 is continued around about half the circumference of the disk 4 the thread-grippers continue in their closed position, Figs. 13 to 16, and the knotter comes into operation. The latter at the beginning of its work is in the position shown in Fig. 13 and makes, at the upstroke of the needle-holder 25 with the needle 51 (thread-holder with the angle-lever 36, which is opened by the incline on the bar 42 to release the thread) and the toothed bar 44, from the commencement of the formation of the knot to its completion, one revolution and a half, always in the same direction. Fig. 13 shows a front view of Fig. 10 on a smaller scale, the two parts of the thread being represented by two lines one behind the other close to the needle. The upward movement of the toothed bar 44 turns the knotter-spindle 49 in the direction shown by the arrow, and at the beginning of its stroke it is in its left-hand position, and the serrated arm of the small double-angled lever 55 lies in the groove 52. When by the rising of the needle the knotter has turned through half a revolution into the position shown in Fig. 14, then the loop is seized by the closed knotter, as shown in Fig. 14; but the entire knotter has at the same time with its spindle, by means of the V-shaped groove and the screw-point 50, moved to the right away from the axis of the needle. By the further half-revolution of the knotter from the position shown in Fig. 14 to that in Fig. 15 the knob-like projection on the arm 55 of the lever is forced by the further revolution of the spindle against the inclined guide 59 and presses the double angle-lever 55 sidewise, so that its serrated arm is brought out of the groove 52. So far the threads have been twisted once around the closed knotter. By the further revolution from the position in Fig. 15 to that in Fig. 16 the knotter closes again and takes in between the recessed arm 52 and the serrated arm of the double lever 55 the end and the adjoining part of the thread, so that the cutting-off device can then come into operation. The curved guide 68 upon the bar 69, which is connected with the toothed bar 44, has in the meantime risen so high that the roller 67, fixed to the plate 57 by the arm 66, runs upon the curved guide or cam 68. Accordingly the plate 57 is made to turn upon the center 56, as shown in Fig. 19, and by means of the pin 64 in the plate 57 causes the knife-holder 61 to turn upon the pin 60. The knife-blades 58 and 62 are accordingly brought together and sever the threads, as shown in Figs. 16 and 19. The ends of the threads are held by the knotter, and by a further turn of the latter through a quarter of a revolution, as shown in Fig. 17, the process of forming the knot is completed. Fig. 18 shows on a larger scale how the threads are twisted in the position shown in Figs. 16 and 19. All the different operations follow each other quickly and when completed the article $a$, now provided with a knotted loop, is removed from the pin 43, and the machine is again ready for use. The end movement of the spindle 49 with the knotter has for its object to keep the thread always stretched and to draw the knot tight; but the movement described of the spindle 49 is not absolutely necessary, as by the taking off of the knotted loop, together with the drawing out of the thread ends from the knotter, a tightening of the knot results without further operation. Different sizes of loops may be made by making the bar 42, with the pin 43, which serves for the formation of the loops, adjustable vertically.

What I claim, and desire to secure by Letters Patent, is—

A machine of the character described comprising a work-table, a guide having a slot, a needle-bar, a thread-holder pivoted to the needle-bar having a pin working in the slot, a spring angle-lever pivoted to the holder for grasping the thread, a fixed bar, for operating the angle-lever, a pin on which the thread is laid by the holder, thread-grippers located beneath the work-table to which the thread is carried by the holder, a knotter located beneath the work-table, cutting-blades located beneath the knotter, and means for operating the said needle-bar, the said thread-grippers, the said knotter and the said cutting-blade.

In witness whereof I subscribe my signature in presence of two witnesses.

WILLY BUSCH.

Witnesses:
 JEAN GRUND,
 C. BUCHMÜLLER.